(12) United States Patent
Moore et al.

(10) Patent No.: US 8,239,748 B1
(45) Date of Patent: Aug. 7, 2012

(54) MEDIA STREAM SYNCHRONIZATION USING DEVICE AND HOST CLOCKS

(75) Inventors: Jeff Moore, Daly City, CA (US); Jean-Michel Berthoud, San Jose, CA (US); Tim Cherna, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 323 days.

(21) Appl. No.: 12/709,317

(22) Filed: Feb. 19, 2010

Related U.S. Application Data

(63) Continuation of application No. 10/769,139, filed on Jan. 30, 2004, now Pat. No. 7,669,113.

(51) Int. Cl.
*G06F 17/00* (2006.01)
(52) U.S. Cl. .......................... 715/201; 715/202; 715/203
(58) Field of Classification Search .................. 715/201, 715/202, 203
See application file for complete search history.

(56) References Cited

U.S. PATENT DOCUMENTS

| | | | | |
|---|---|---|---|---|
| 5,661,665 A | * | 8/1997 | Glass et al. | 348/423.1 |
| 5,719,786 A | * | 2/1998 | Nelson et al. | 709/219 |
| 5,815,689 A | * | 9/1998 | Shaw et al. | 713/400 |
| 6,212,574 B1 | * | 4/2001 | O'Rourke et al. | 719/321 |
| 6,505,153 B1 | * | 1/2003 | Van Thong et al. | 704/211 |
| 2002/0112247 A1 | * | 8/2002 | Horner et al. | 725/112 |
| 2005/0125734 A1 | * | 6/2005 | Mohammed et al. | 715/731 |

* cited by examiner

*Primary Examiner* — Doug Hutton, Jr.
*Assistant Examiner* — Andrew Dyer
(74) *Attorney, Agent, or Firm* — Fenwick & West LLP

(57) ABSTRACT

A synchronization manager synchronizes multiple media streams. The synchronization manager queries a media stream output device associated with each media stream to synchronize, and in response receives the current device clock time of each device, each device's next available media stream output time, and each device's delta between available media stream output times. The synchronization manager uses this timing information to determine an earliest available media stream output time common to each media stream output device, and synchronizes the output of the media streams by providing each stream to its associated output device at the earliest available common output time.

10 Claims, 3 Drawing Sheets

MEDIA STREAM SYNCHRONIZATION USING DEVICE AND HOST CLOCKS

BACKGROUND

1. Field of Invention

The present invention relates generally to synchronization of media streams, and more specifically to utilizing clocks on multiple media devices and on a single host to synchronize multiple media streams.

2. Background of Invention

In a multimedia environment, it is often necessary to synchronize multiple streams of data (e.g., a video stream and an audio stream). Although synchronizing video with audio is a common example, such a challenge occurs whenever it is desired to simultaneously output at least two streams of data of any type that is metered by time. Although it is desirable to start each stream at the same time, simply simultaneously sending each media stream to its physical output hardware will not necessarily ensure synchronization. Physical output devices typically have constraints binding available output start times. For example, a video output device can only begin outputting received data at the beginning of a vertical synchronization cycle. Other devices such as audio are somewhat more flexible, but still have some inherent latency between the time data is received and the subsequent output time. Latency and constraints on possible output start times are a function of the specific hardware, and thus vary a great deal, not only between media types, but also from device to device.

When the video and audio streams are output by a common device, synchronization can be achieved by the associated device driver delaying the audio output until a vertical synchronization cycle begins, adjusted for the time of the audio output latency. However, this solution only works for a single device. The synchronizing device driver is not aware of other output devices, and the other output devices and their controlling software have no information concerning the operations of the synchronizing device driver.

What is needed are methods, systems and computer program products that synchronize multiple media streams, even where the media streams are processed by separate devices.

SUMMARY OF INVENTION

A synchronization manager synchronizes multiple media streams. The synchronization manager queries a media stream output device associated with each media stream to synchronize. In response, the synchronization manager receives the current device clock time of each device, each device's next available media stream output time, according to its device clock, and each device's delta between available media stream output times. Using this timing information, the synchronization manager determines an earliest available media stream output time common to each media stream output device, and synchronizes the output of the media streams by providing each stream to its associated output device at the earliest available common output time. In some embodiments, the synchronization manager defines one media stream as a master and slaves other stream(s) off the master stream. In other embodiments, the synchronization manager does not define a master, and instead independently sends each media stream to its associated output device as close to the common output time as possible.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
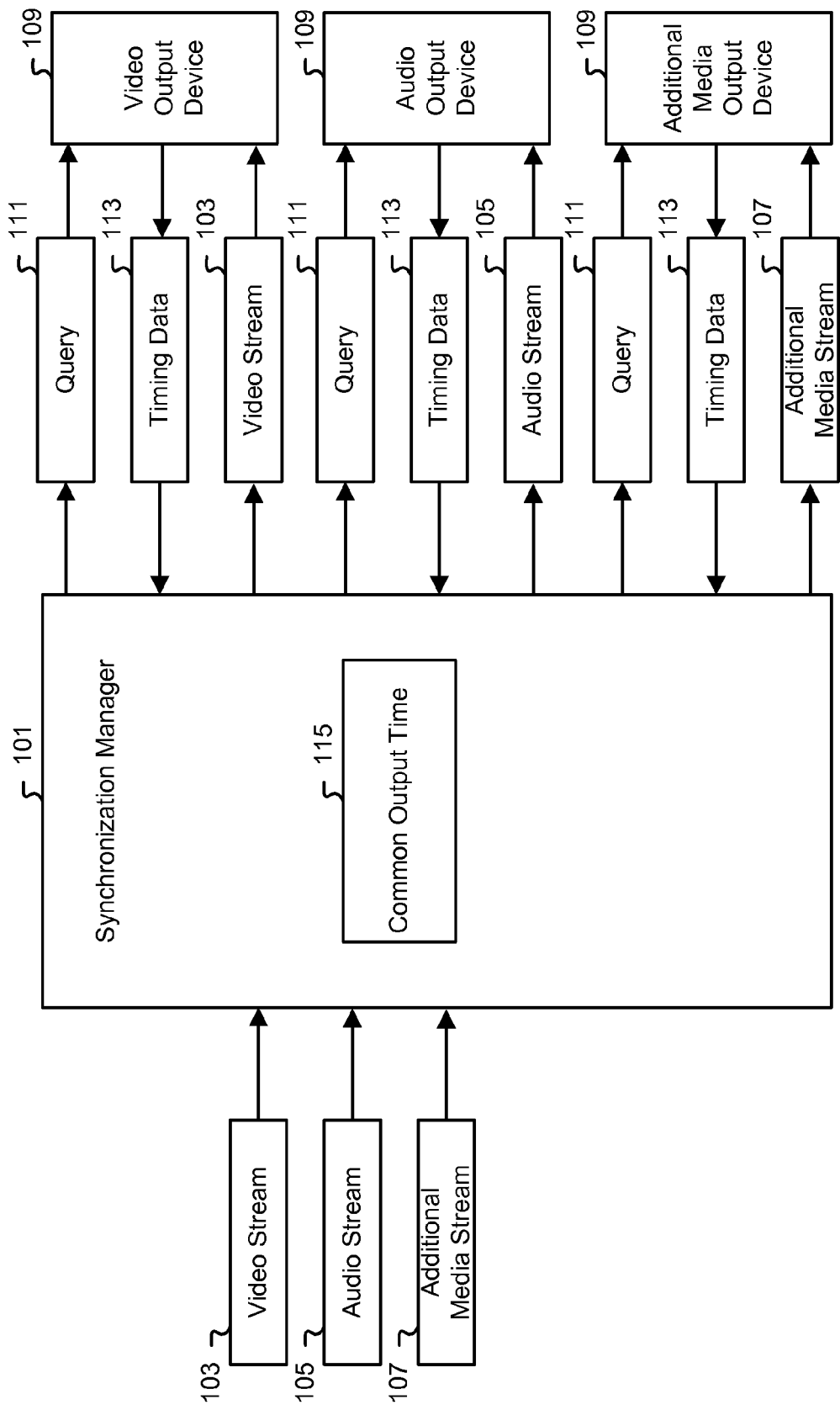
FIG. 1 is a block diagram, illustrating a high level overview of a system for practicing some embodiments of the present invention.

FIG. 1 illustrates a high level overview of a system 100 for performing some embodiments of the present invention. A synchronization manager 101 synchronizes the output of multiple media streams. It is to be understood that although the synchronization manager 101 is illustrated as a single entity, as the term is used herein a synchronization manager 101 refers to a collection of functionalities which can be implemented as software, hardware, firmware or any combination of the three. Where a synchronization manager 101 is implemented as software, it can be implemented as a standalone program, but can also be implemented in other ways, for example as part of a larger program, as a plurality of separate programs, or as one or more statically or dynamically linked libraries.

FIG. 1 illustrates the synchronization of a video stream 103, an audio stream 105 and an additional media stream 107. It is to be understood that the present invention is not limited to the illustrated types or number of media streams. In various embodiments, the synchronization manager 101 synchronizes a variety of types of two or more media streams. Examples of other media stream types are a closed captioning data stream, a stream of MIDI events, a stream of text to Braille data and a stream of side band data. Streams of any type of data that can be metered by time can be synchronized according to the present invention. Other examples of data types will be apparent to those of ordinary skill in the relevant art in light of this specification.

Each media stream type is accompanied by an associated output device 109 (in some instances, more than one data stream type can be processed by a single device 109, e.g., audio and video). Thus, FIG. 1 illustrates a video output device 109, an audio output device 109 and an additional media output device 109, but of course other device 109 types are possible.

In order to synchronize the streams, the synchronization manager 101 sends a query 111 to each output device 109, requesting the current time according to the device's 109 clock. Because each device 109 has its own hardware clock, the synchronization manager 101 gleans the local time according to each device 109 in order to facilitate the synchronization, as described further below. The synchronization manager 101 also requests the next available time at which each device 109 can begin outputting a received media stream. Recall that because of device 109 specific output latency and output timing constraints, the next available output time for each device 109 varies. Of course, each device 109 expresses its next available output time according to its own clock. Additionally, the synchronization manager's 101 query 111 of each device 109 requests the device's 109 delta between media stream output times. Each device 109 has a specific amount of time between its possible output start times (e.g., in the case of a video device 109, the time between vertical synchronization cycles). This information can be utilized by the synchronization manager 101 to facilitate the stream synchronization, as explained below.

Responsive to the queries 111, the synchronization manager 101 receives the above-described timing data 113 from each output device 109. The synchronization manager 101 uses the timing data 113 from each device 109 to determine the earliest available common time 115 at which each device 109 can begin output of a received media stream. Because the synchronization manager 101 has the device clock time for each device 109, the next available output start time for each device 109 and the delta between available start times for each device 109, the synchronization manager 101 can calculate the earliest available start time 115 common to all devices 109. The mechanics of performing the relevant calculations will be apparent to those of ordinary skill in the art in light of this specification.

Once the synchronization manager 101 has calculated the earliest available start time 115 common to each device 109, the synchronization manager 101 synchronizes the output of the multiple media streams by providing each media stream to its associated output device 109 at the calculated time 115 (optionally, within an acceptable margin of error).

In some embodiments, the synchronization manager 101 performs this synchronization by slaving one or more media streams off a master stream. For example, in one embodiment the synchronization manager 101 synchronizes a video stream 103 and an audio stream 105 by slaving the audio stream 105 off the video stream 103. In other embodiments, rather than defining one stream as a master and the other(s) as slave(s), the synchronization manager 101 instead individually sends each stream to its associated device 109 as close to the calculated common start time 115 as possible.

Figure 2:
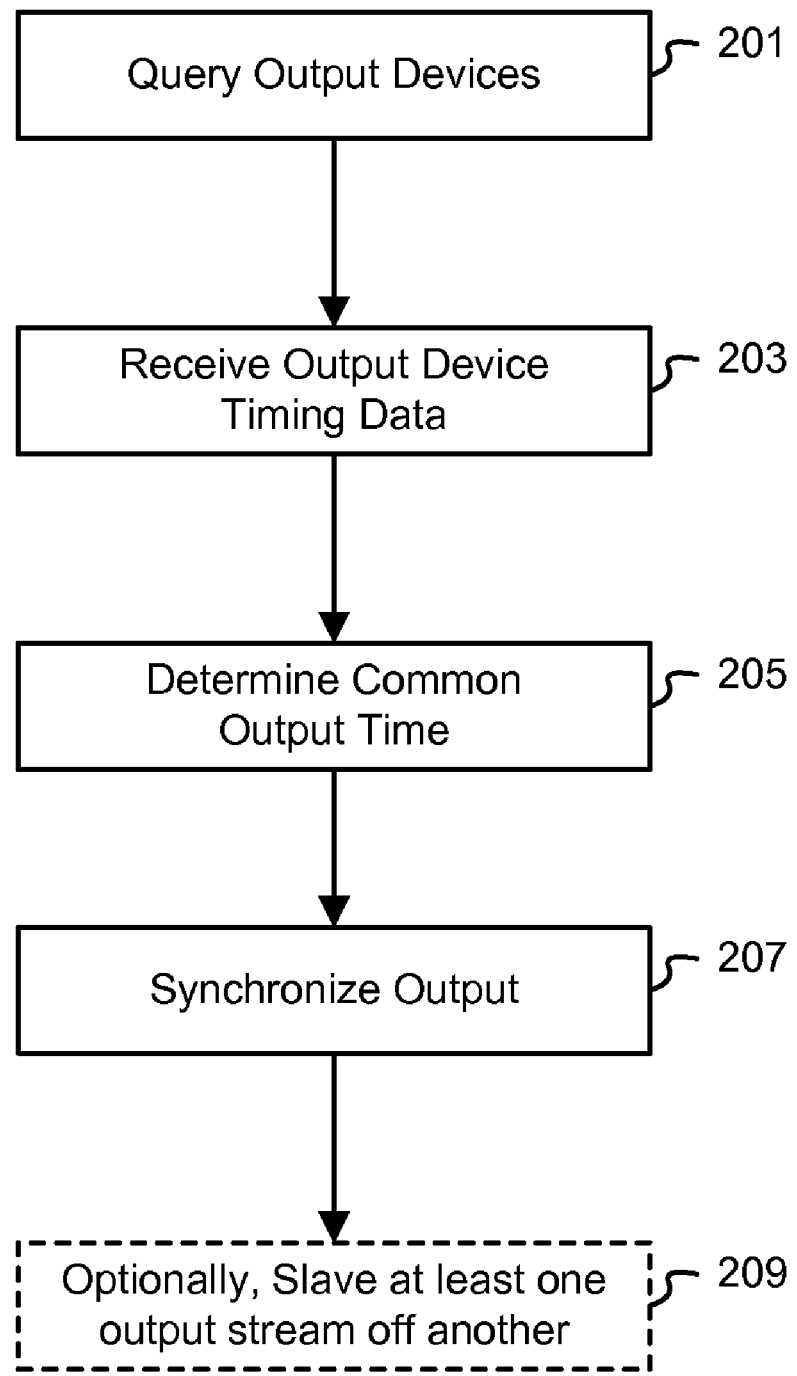
FIG. 2 is a flowchart, illustrating steps for synchronizing multiple media streams, according to some embodiments of the present invention.

FIG. 2 illustrates steps for the synchronization manager 101 to synchronize multiple media streams, according to some embodiments of the present invention. The synchronization manager 101 queries 201 the output devices 109, as described above. In response to querying 201 the output devices 109, the synchronization manager 101 receives 203 the timing data 113 from each output device 109. As described above, the synchronization manager 101 uses the timing data 113 to determine 205 the next available common output time 115, and synchronizes 207 the output of the media streams accordingly. In some embodiments, the synchronization manager 101 synchronizes 207 the output of the media streams by defining one stream as a master, and slaving 209 the other stream(s) off the master stream.

Figure 3:
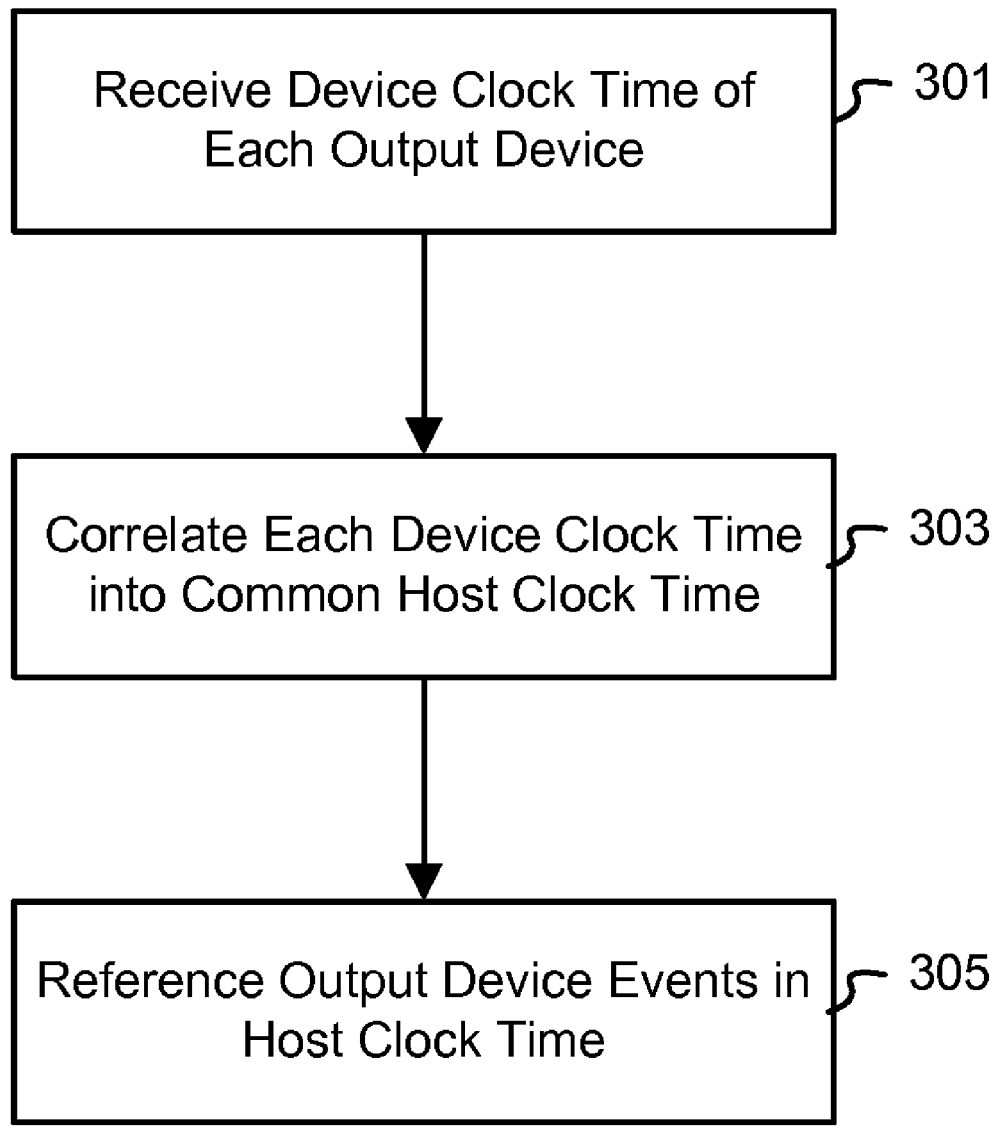
FIG. 3 is a flowchart, illustrating steps for correlating each received device clock time into a common host clock time, according to some embodiments of the present invention.

Note that the synchronization manager 101 has the local device clock time of each device 109. In some embodiments of the present invention, the synchronization manager 101 correlates each received device clock time into a common host clock time. This process is illustrated in FIG. 3, according to some embodiments of the present invention. The synchronization manager 101 receives 301 the device clock time of each media stream output device 109, and correlates 303 each received device clock time into host clock time (the time according to the clock of the computing device associated with the synchronization manager 101, e.g., the clock of the central processing unit of the computing device on which the synchronization manager 101 is executing). With this correlation, the synchronization manager 101 can reference 101 events on the plurality of media stream output devices 109 in the common host clock time. Note this referencing of device 109 events in host clock time is not limited to referencing media stream start times. For example, the synchronization manager 101 can use the correlation of each device clock time into host time to calculate the time of the playback of specific frames and the like, by output devices 109, in host clock time.

As will be understood by those familiar with the art, the invention may be embodied in other specific forms without departing from the spirit or essential characteristics thereof. Likewise, the particular naming and division of the modules, features, attributes, methodologies, managers and other aspects are not mandatory or significant, and the mechanisms that implement the invention or its features may have different names, divisions and/or formats. Furthermore, as will be apparent to one of ordinary skill in the relevant art, the modules, features, attributes, methodologies, managers and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer system for synchronizing multiple media streams, the computer system comprising:
a processor;
a computer readable storage medium storing computer-executable program instructions, the program instructions when executed by one or more processing units cause the one or more processing units to perform steps comprising:
initiating queries to a plurality of media stream output devices;
receiving a) current time of each queried media stream output device according to its device clock, b) next available media stream output time of each queried media stream output device according to its device clock and c) a delta between available media stream output times;
determining an earliest available media stream output time common to each media stream output device based on data received responsive to the queries; and
providing each media stream an associated media stream output device at the earliest available common media stream output time for synchronizing output of the plurality of media streams.

2. The computer system of claim 1, wherein the program instruction when executed further cause the one or more processing units to perform steps comprising:
defining one media stream of the plurality as a master media stream; and slaving at least one additional media stream of the plurality off the master media stream.

3. The computer system of claim 1 wherein the plurality of media streams comprises at least a video stream and an audio stream.

4. The computer system of claim 1 wherein at least one of the plurality of media streams comprises a video stream.

5. The computer system of claim 1 wherein at least one of the plurality of media streams comprises a audio stream.

6. The computer system of claim 1 wherein at least one of the plurality of media streams comprises a closed captioning data stream.

7. The computer system of claim 1 wherein at least one of the plurality of media streams comprises a stream of MIDI events.

8. The computer system of claim 1 wherein at least one of the plurality of media streams comprises a stream of text to Braille data.

9. The computer system of claim 1 wherein at least one of the plurality of media streams comprises a stream of side band data.

10. The computer system of claim 1, wherein the program instructions when executed further cause the one or more processing units to perform steps comprising:
correlating each received device clock time to a common host clock time; and
referencing events on the plurality of media stream output devices based on the common host clock time.

\* \* \* \* \*